(12) United States Patent
Khanna (10) Patent No.: US 10,226,029 B2
(45) Date of Patent: Mar. 12, 2019

(54) VEHICLE MONITORING SYSTEM FOR SECTION DIVIDER ACTIVATION

(71) Applicant: Honda Motor Co., Ltd., Tokyo (JP)

(72) Inventor: Rahul Khanna, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 98 days.

(21) Appl. No.: 15/642,557

(22) Filed: Jul. 6, 2017

(65) Prior Publication Data

US 2019/0008121 A1    Jan. 10, 2019

(51) Int. Cl.
| | | |
|---|---|---|
| *A01K 15/04* | (2006.01) | |
| *B60K 37/06* | (2006.01) | |
| *G06K 9/00* | (2006.01) | |
| *G06K 9/62* | (2006.01) | |

(52) U.S. Cl.
CPC .............. *A01K 15/04* (2013.01); *B60K 37/06* (2013.01); *G06K 9/00369* (2013.01); *G06K 9/00718* (2013.01); *G06K 9/00838* (2013.01); *G06K 9/6256* (2013.01); *B60K 2350/35* (2013.01)

(58) Field of Classification Search
CPC .. A01K 15/04; G06K 9/00369; G06K 9/6256; G06K 9/00838; G06K 9/00718; B60K 37/06; B60K 2350/35
See application file for complete search history.

(56) References Cited

U.S. PATENT DOCUMENTS

| | | |
|---|---|---|
| 6,026,340 A | 2/2000 | Corrado et al. |
| 6,113,137 A | 9/2000 | Mizutani et al. |
| 2008/0136205 A1 | 6/2008 | Hoffman et al. |
| 2009/0234542 A1 | 9/2009 | Orlewski |
| 2009/0256377 A1 | 10/2009 | Beechie et al. |
| 2014/0168441 A1* | 6/2014 | Koike ................... G08B 21/22 348/148 |
| 2014/0252751 A1 | 9/2014 | Avanian |
| 2016/0046215 A1 | 2/2016 | Lebowitz |
| 2017/0021798 A1 | 1/2017 | Sanchez Huipio et al. |

FOREIGN PATENT DOCUMENTS

| | | |
|---|---|---|
| CN | 203637732 U | 6/2014 |
| KR | 101324948 B1 | 12/2013 |

* cited by examiner

*Primary Examiner* — Yuen H Wong
(74) *Attorney, Agent, or Firm* — Honda Patents & Technologies North America, LLC; Aaron C. Fong (57) ABSTRACT

Interior vehicle sensors and a recognition routine identify the presence of a companion animal within a vehicle, a controller operates at least one actuator to interpose a barrier between vehicle areas automatically adjust the barrier according to the animal's detected attributes to restrict the movement of the companion animal within the vehicle's interior.

20 Claims, 9 Drawing Sheets

VEHICLE MONITORING SYSTEM FOR SECTION DIVIDER ACTIVATION

BACKGROUND

Pets are an increasing part of everyday life. As such, people are taking their pets with them in their vehicles more often. Transporting a pet or pets within a vehicle can be difficult if the pet or pets are not prevented from accessing certain areas of the vehicle at certain times. There is therefore a need for a means of containing pets into an area of the car which is safe for the pet and the occupants of the vehicle.

Currently, there are two main ways to curtail the movement of a pet within an area of a vehicle. The first type is a manually installed and adjusted barrier which may be erected and adjusted by hand. This provides a mechanical barrier between areas of a vehicle to restrict the animal's movement. The second type of restriction uses a harness and tether or other mechanical restraint to prevent the animal's movement. Some variations of this allow the user vary the length of the restraint tether to restrict the animal's movement based on a computerized identification tag.

While the described methods of restraining an animal within a vehicle's interior are generally effective, these both require fairly substantial user intervention in order to implement. Harnesses require that the user connect a wriggling animal to the proper restraint points, and the use of net barriers require an involved take-down procedure when not in use.

Currently, methods exist for detecting of occupants within vehicles using a variety of techniques, such as thermal, activation, weight, motion, etc. Utilizing these techniques, it is possible to detect the presence of an animal within a vehicle.

While the aforementioned examples have previously attempted to solve aspects of this problem, there has been no solution which allows for an easy, automatic, and adjustable way to contain a pet in a particular area of a vehicle.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A vehicle monitoring system (VMS) is disclosed that utilizes sensors to determine whether a vehicle is occupied, and the type of occupants. This system may monitor occupants through cameras or other imaging sensors located in the roof portion of the vehicle passenger cabin. The system may also utilize other sensors and transducers (e.g., pressure, sound). By executing detection logic, the system may detect when an animal is within the vehicle. If the system determines that there is an animal in the vehicle, a barrier may be interposed between areas of the vehicle, preventing the animal from crossing between areas within the vehicle.

The system may make adjustments to the position of the barrier based on the animal type and size. The barrier may be constructed of a transparent material, or wire, mesh, or screen material(s), to allow visibility through the barrier. Different types of barriers may be used depending on the areas to control. For example, the barrier may extend the entire width of the vehicle, or may extend only to block the area between two seats. The barrier may be employed between different areas of the vehicle. For example, the barrier may be employed between the front and back seats, or between the back seats and the rear vehicle cargo area.

The barrier may be constructed of a flexible material which may allow the barrier to be rolled up and stored in a small space when not in use. The barrier may also use a semi-rigid or rigid construction, utilizing multiple articulated sections which in a deployed state form the barrier. For example, the barrier may also be constructed of articulated slats allowing the individual slats to stack, or of a material with enough flexibility to allow roll up. In some cases, the barrier may be stowed to the sides of the opening over which it is interposed and be drawn across, or the barrier may be extended from the top or bottom of the vehicle.

In one embodiment, the barrier may be stowed in seats or seats adjoining the opening over which the barrier is interposed. To aid in the interposition of the barrier, tracks or guides may be used to position the barrier. A variety of inputs may control the interposition of the barrier between areas of the vehicle. The system may employ a user interface for manual user control so the user may override or program system settings. The system may also be operated using additional input to the VMS from other vehicle systems to operate the system. For example, the system may utilize information from the vehicle's main CPU to determine whether or not the vehicle has reached its destination and may deactivate the barrier. The CPU may accomplish this by utilizing the state of the vehicle, for example the state of the power or ignition system, the movement of the vehicle, GPS location or other methods known in the art to determine vehicle location and operational state.

The system may also utilize direct user intervention or pre-programmed parameters for activation and deactivation of the barrier deployment. For example, the user may define that the system should employ the barrier upon detecting the presence of a specific dog, and only lower the barrier if the door is opened after reaching a specific destination. Further, the system may employ the barrier if the car is unlocked from a remote control.

Presence detection may be performed utilizing a variety of techniques. In one embodiment, lower-level sensors and transducers may be employed to activate the recognition system to conserve resources. For example, presence detection may be done by passive infrared detector (PIR), or active infrared detector (AIR), or a pressure force sensor. Once the presence of an occupant is detected, the recognition system may be activated to identify the occupant.

Alternatively, the recognition system may also be used as a presence detection system to detect the occupant. For example, a camera used for identification via image recognition may utilize a change in pixels between frames to detect motion from an occupant in the frame. Once this occurs, the system may transition into more active recognition. The system may also utilize these mechanisms in concert, utilizing input from both to assess vehicle occupants. The system may utilize a variety of ways to identify an occupant within the vehicle. Utilizing machine learning techniques well known in the art, a program may be trained to recognize the sight of an animal, the sound of an animal, the vibration pattern caused by the animal on the seat, or the distribution of weight. For example, the system may identify specific features within a captured video stream and may extract features from the image and utilize those to correlate to the most likely occupant of the area.

The system may correlate attributes from at least one sensor input to identify the occupants in the back seat. For example, the system may utilize visual sensors (CMOS, infrared detectors, AIR/PIR, LIDAR), temperature sensors, vibration and motion detectors (microphones, piezo vibration sensors, accelerometers), and force/weight sensors. The system may first identify the type of occupant in the seat and may automatically distinguish between a human and an animal, and further distinguish between types of animal and approximate dog breeds. The system may estimate the dimensions of an animal by approximating those dimensions based on the animal's size relative to the interior of the vehicle and distance to the sensors. The system may utilize this data, or calculate additional data which may be useful if it may be calculated from data gathered. For example, the system may be able to calculate an average volume of the animal and apply an average density for mammals to estimate the weight of the animal.

The system may employ different ways to set the correct restrictiveness of the barrier (e.g., extended height and/or width) depending on the animal in the area. The system may utilize pre-programmed attributes based on the information collected by the recognition system. These may be based on species, breed, activity level and size. The system may approximate a breed with known traits, such as activity level and agility. For example, the system may determine there is a cat weighing approximately 7 lbs and raise the barrier due to the innate jumping ability of cats of that size. However, the system may identify a similarly sized dog and allow the barrier to be much lower. In instances where there is a possible conflict between multiple levels of movement restriction, for instance, there is a child and a dog, or two differently sized dogs, the system may choose the most restrictive (highest) setting specified for the occupants.

Operating parameters may specify what level of restriction the barrier should provide based on the input of the recognized animal. The operating parameters may be predefined, user defined, or determined at runtime. The operating parameters may also be updated based on the user's use of the system and the success of the barrier. Once the processor determines the type or identity of an occupant of an animal in the back, the processor then retrieves operation parameters which are indicated by the recognized animal from a control memory structure, and transmits the operation parameters to the controller which are indicated by the recognized occupant.

The system may allow a training period for the user to specify different pets and indicate the levels of confinement necessary for each pet, similarly, there may be default settings based on average levels of movement restriction based on average animal size. For example, the system may identify a dog weighing approximately 100 lbs and raise the barrier to its maximum height, on the next drive when a smaller dog is present, the system may adjust (lower) the barrier to a lower height. The system may adjust the barrier automatically if it determines the animal is more active or larger than initially determined.

The system may also employ machine learning techniques well-known in the art to adapt settings based on the user's changes to the settings of the system. The user may have identified specific pets to the system and the system may have recorded that despite the default settings for an animal of this size and/or type the user adjusts the barrier to a different level, and the system may automatically recall the most frequently used settings or an average of heights employed for that animal or an animal with similar attributes and place the barrier in that state. The controller receives the operation parameters from the processor and controls an actuator to articulate a barrier to the proper level based on the received operation parameters. For example, the system may utilize textual or numerical signals to specify the level to which the controller should raise the barrier.

Generally, the system embodiments and processes described herein are applicable to partitioning any defined space with a barrier, based on dynamic conditions and detection of animal vs human occupant types for the defined space.

Figure 1:
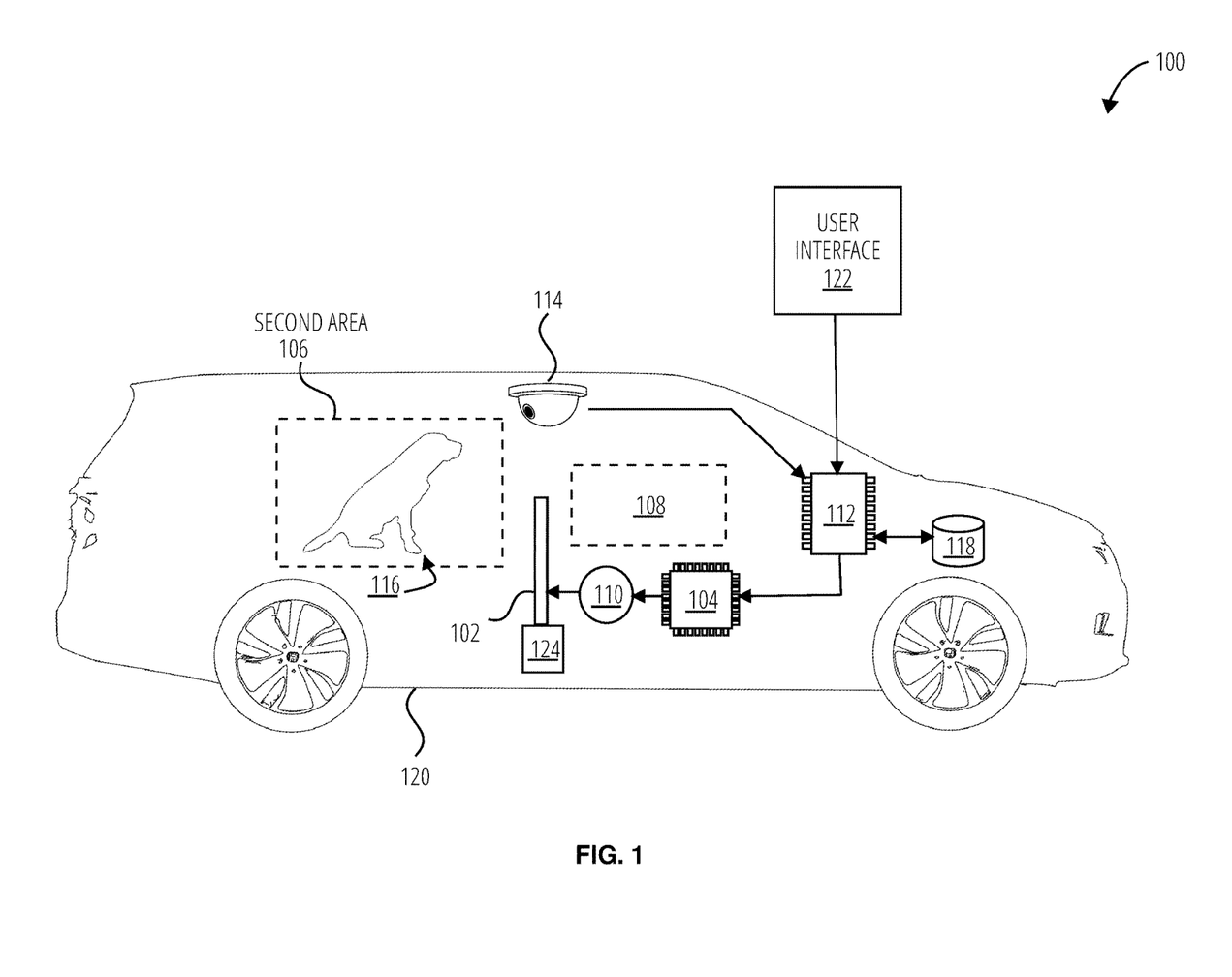
FIG. 1 illustrates an embodiment of a system for dividing areas within a vehicle 100.

Referring to FIG. 1, a system 100 for dividing areas within a vehicle (e.g., vehicle 120) comprises a barrier 102, a controller 104, a second area 106, a first area 108, an actuator 110, a processor 112, a plurality of sensors 114, an animal occupant 116, a control memory structure 118, the vehicle 120, a user interface 122, and a barrier storage compartment 124. The controller 104, processor 112, control memory structure 118, and user interface 122 comprise logic to carry out the methods described herein.

The plurality of sensors 114 within the vehicle 120 monitors an animal occupant 116 within the second area 106. The processor 112 receives the sensor input and processes the sensor input with a recognition routine to extract an animal occupant identification to initiate a selector control signal to select a set of operation parameters from a control memory structure 118. The operation parameters are applied to the controller 104, which sends a control signal to the actuator 110 to interpose the barrier 102 between the first area 108 and the second area 106. The barrier 102 may be interposed from a barrier storage compartment 124, and the user may provide additional control input via the user interface 122.

Figure 2:
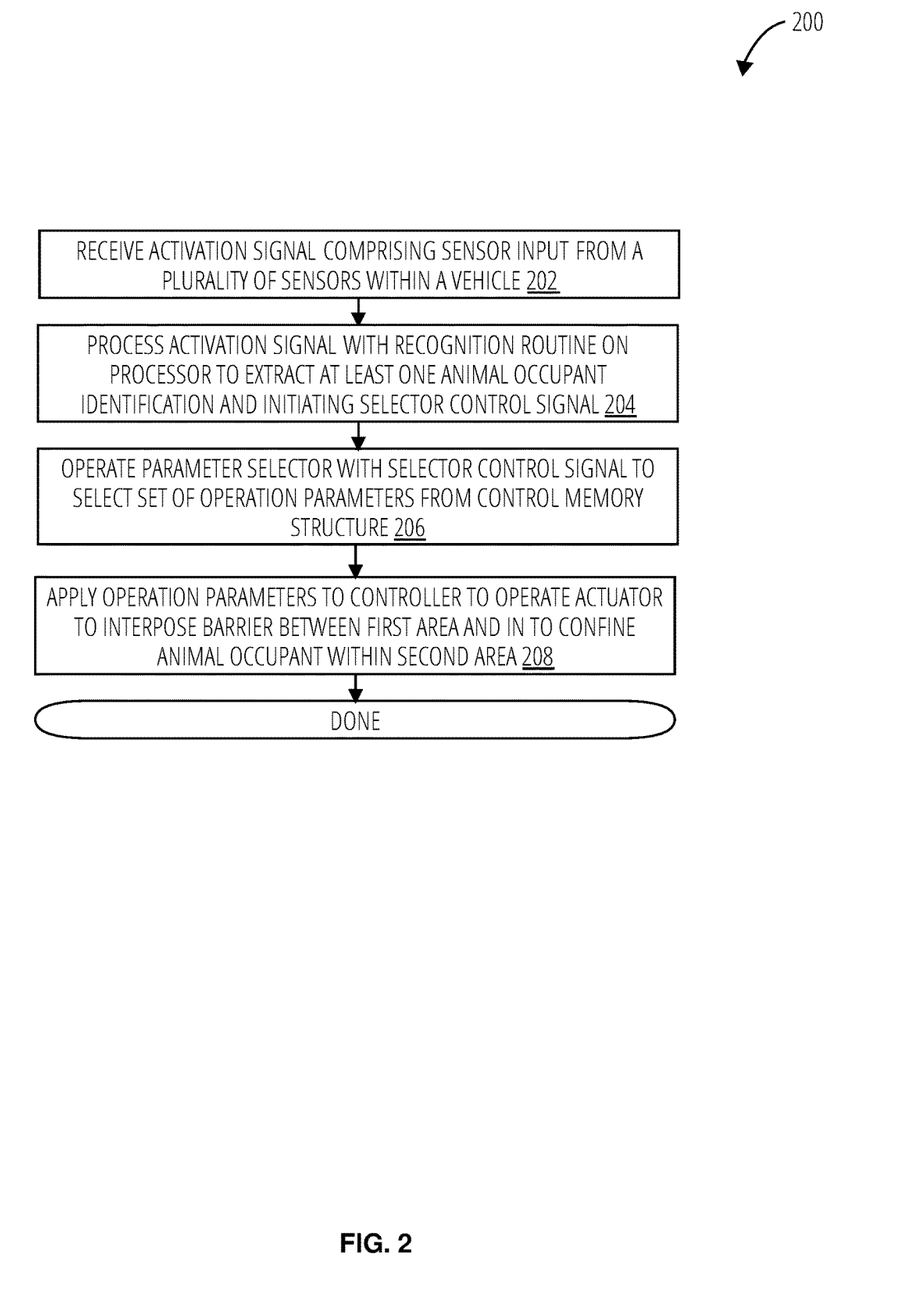
FIG. 2 illustrates a process for containing an animal occupant within a vehicle 200 in accordance with one embodiment.

The system 100 for dividing areas within a vehicle 120 may be operated in accordance with the processes outlined in FIG. 2. A process 200 for containing an animal occupant within the vehicle 120 begins by receiving an activation signal comprising sensor input from a plurality of sensors within a vehicle (block 202). A processor processes the activation signal with a recognition routine to extract at least one animal occupant identification and initiates a selector control signal (block 204). A parameter selector is operated with a selector control signal to select a set of operation parameters from a control memory structure (block 206). The processor applies operation parameters to a controller to operate an actuator to interpose to confine the animal occupant within the second area (block 208).

Receiving the activation signal may include sensor input from a group of sensors within a vehicle. The barrier may be interposed between the first area and the second area from at least one barrier storage compartment. The activation signal may be initiated from the animal occupant identification, and also by the detection of a preset condition. The preset condition may further include, at least one of: the vehicle's state, an action performed via a user interface, the location of the vehicle, detection of human or animal occupants, and/or a configuration of human and animal occupants. The configuration of human and animal occupants may further include a human in the first area and an animal in the second area. The recognition routine may further include applying the sensor input to a trained neural network and/or blob detection, feature extraction and correlation. For example, a convolutional neural network may be used. The barrier may include a see-through portion which comprise at least one of: a transparent material and/or a opaque material non-occlusively configured with at least one aperture. The first area and the second area may include different occupant areas within the vehicle, and the second area may further include a cargo area within the vehicle.

Figure 3:
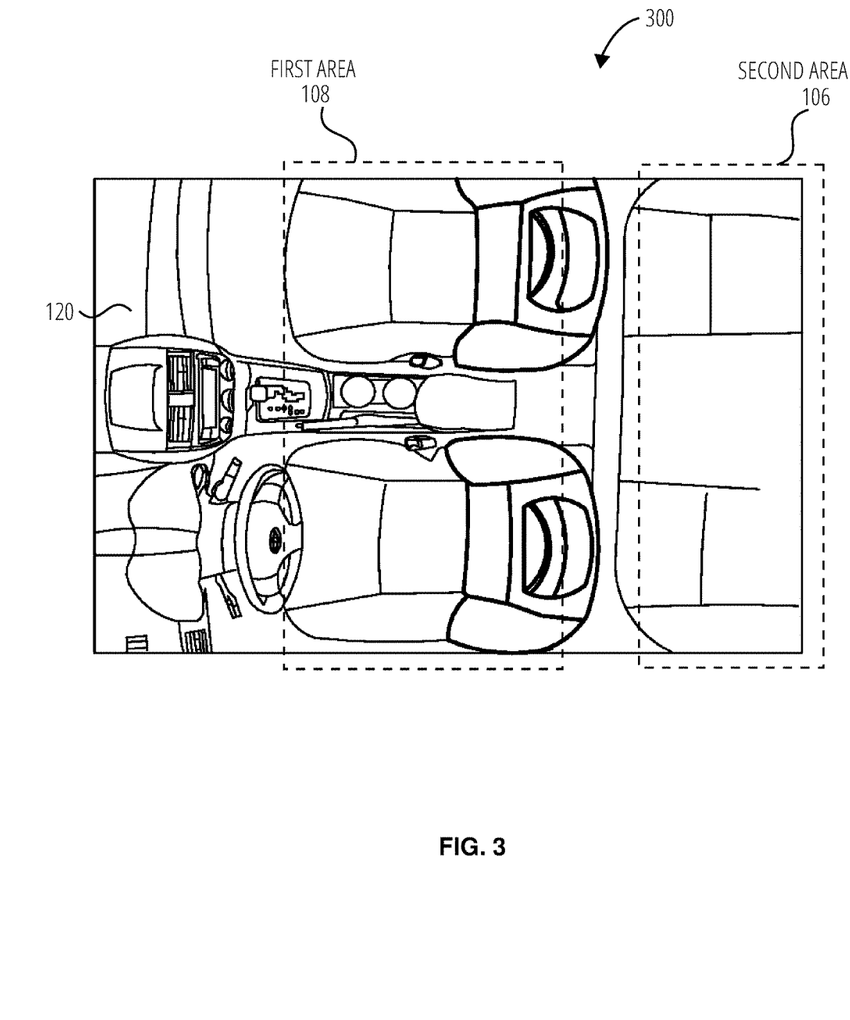
FIG. 3 illustrates an environment 300 for a system for dividing areas within a vehicle 100.
Figure 4:
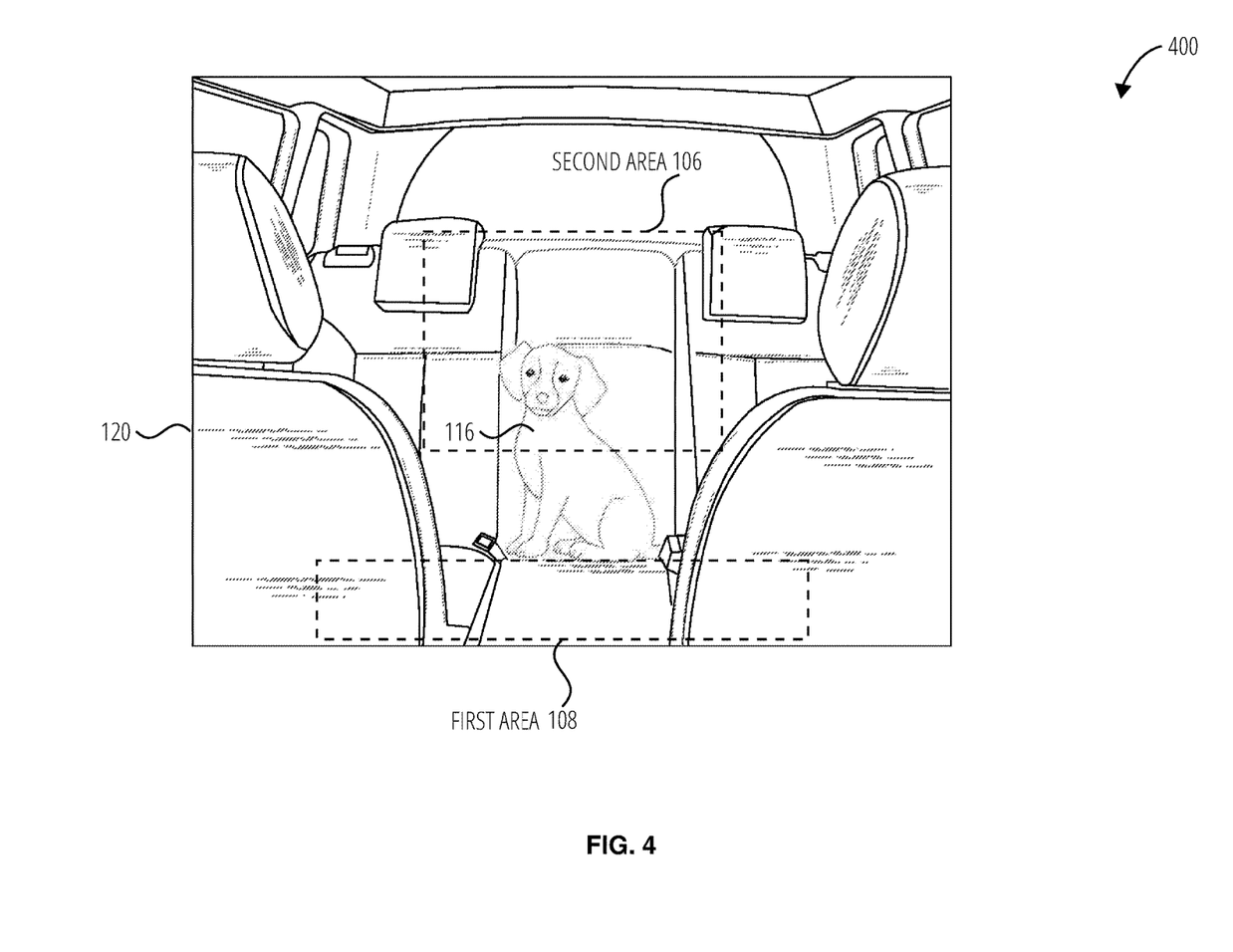
FIG. 4 illustrates an environment 400 for a system for dividing areas within a vehicle 100.

Referring to FIG. 3, the environment 300 comprises the interior of a vehicle 120. The vehicle 120 further comprises the first area 108 and the second area 106. Referring to FIG. 4, the environment 400 comprises the vehicle 120 which includes the second area 106, the animal occupant 116 and the first area 108.

Figure 5:
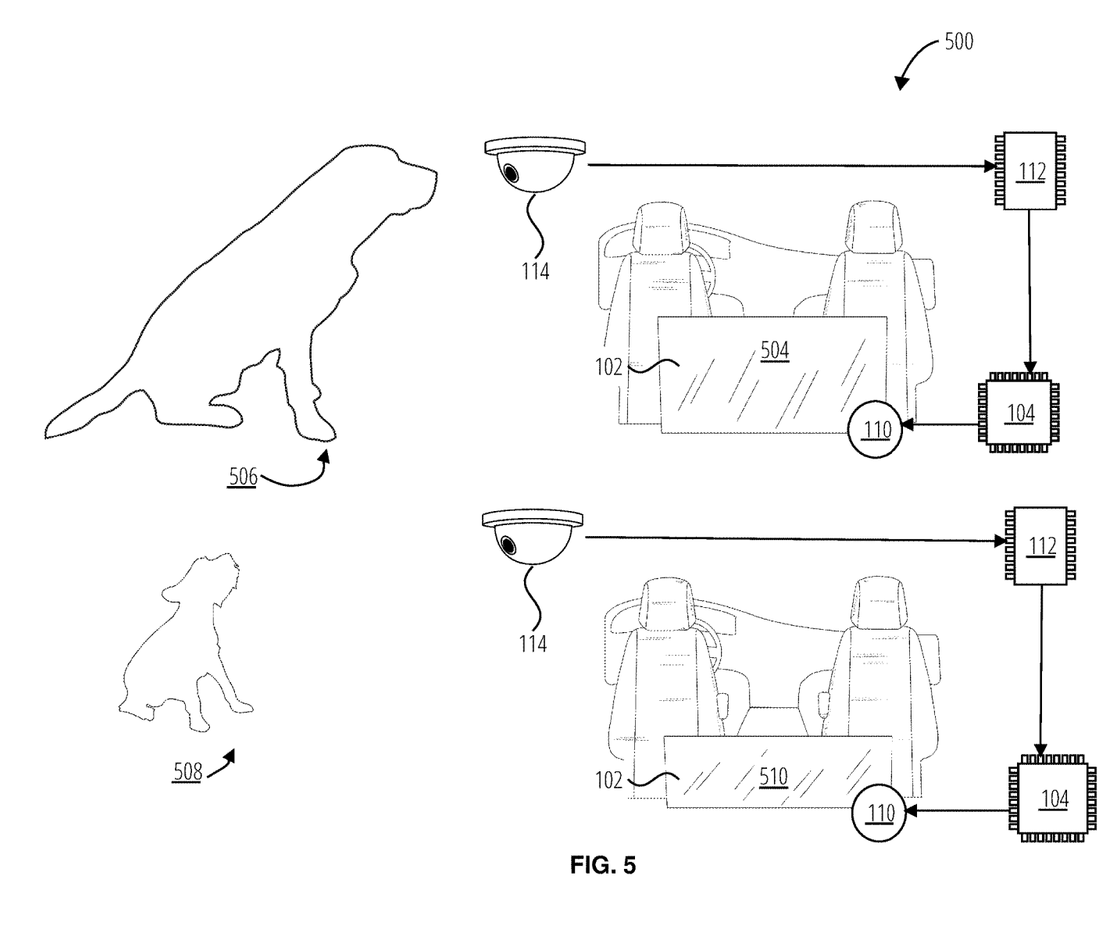
FIG. 5 illustrates an aspect of an embodiment of a system for dividing areas within a vehicle 100.

Referring to FIG. 5, a system for dividing areas within a vehicle 500 comprises a barrier 102, a controller 104, an actuator 110, a processor 112, a plurality of sensors 114, a barrier 102 settable to a high position 504 and a low position 510, a large pet 506, and a small pet 508.

If the plurality of sensors 114 receive input indicating a large pet 506, the sensors 114 send the sensor input to the processor 112 which transmits a control signal to the controller 104 to control the actuator 110 to raise the barrier 102 to the high position 504.

If the plurality of sensors 114 receive input indicating a small pet 508, the sensors 114 send the sensor input to the processor 112 which transmits a control signal to the controller 104 to control the actuator 110 to raise the barrier 102 to the high low position 510.

Figure 6:
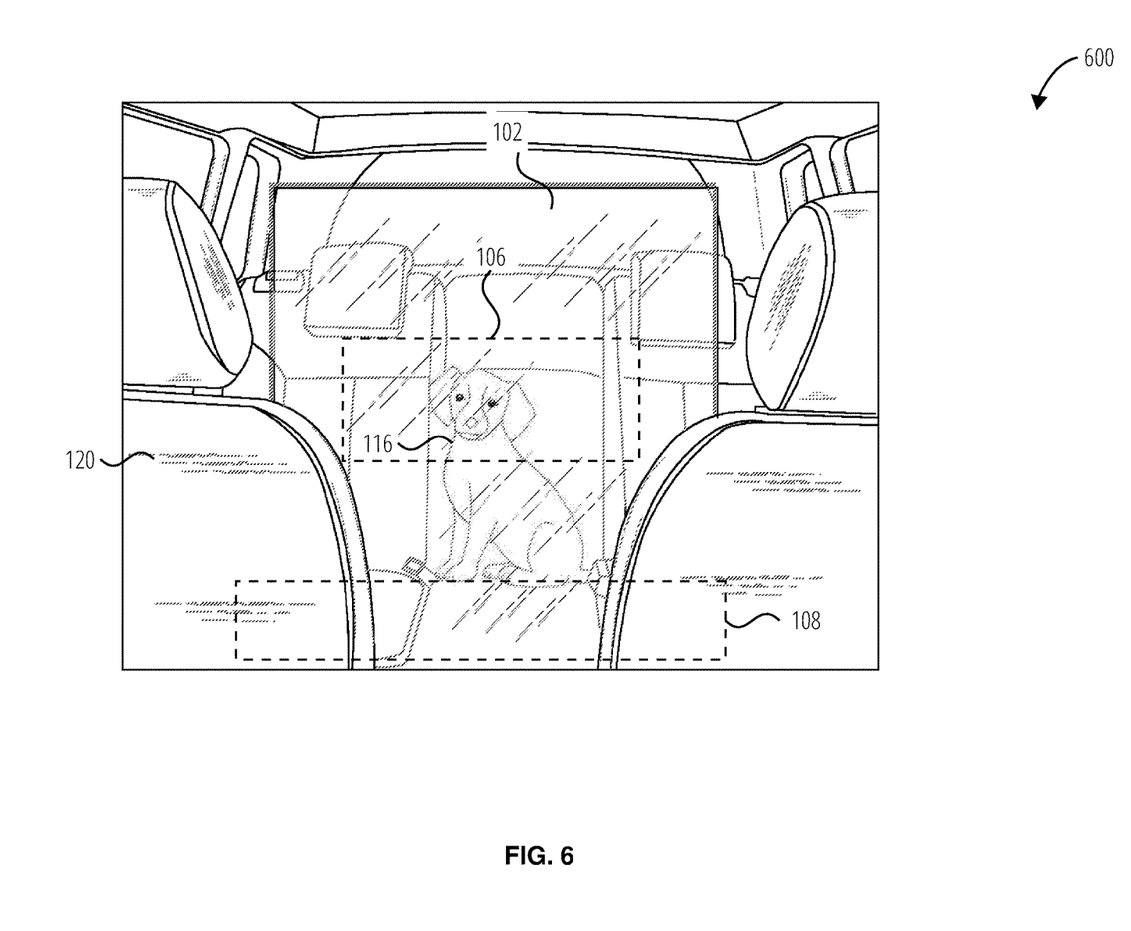
FIG. 6 illustrates an embodiment of a system for dividing areas within a vehicle 600.

Referring to FIG. 6, a system for dividing areas within a vehicle 600 comprises a barrier 102, a second area 106, a first area 108, an animal occupant 116, and a vehicle 120. The barrier when employed may separate the animal occupant 116 in the second area 106 from the first area 108 in the vehicle 120. This may allow the user to keep the animal occupant 116 away from the driver's area. The barrier 102 may be constructed of a see-through material so that when employed, the users may still visually monitor their animal.

Figure 7:
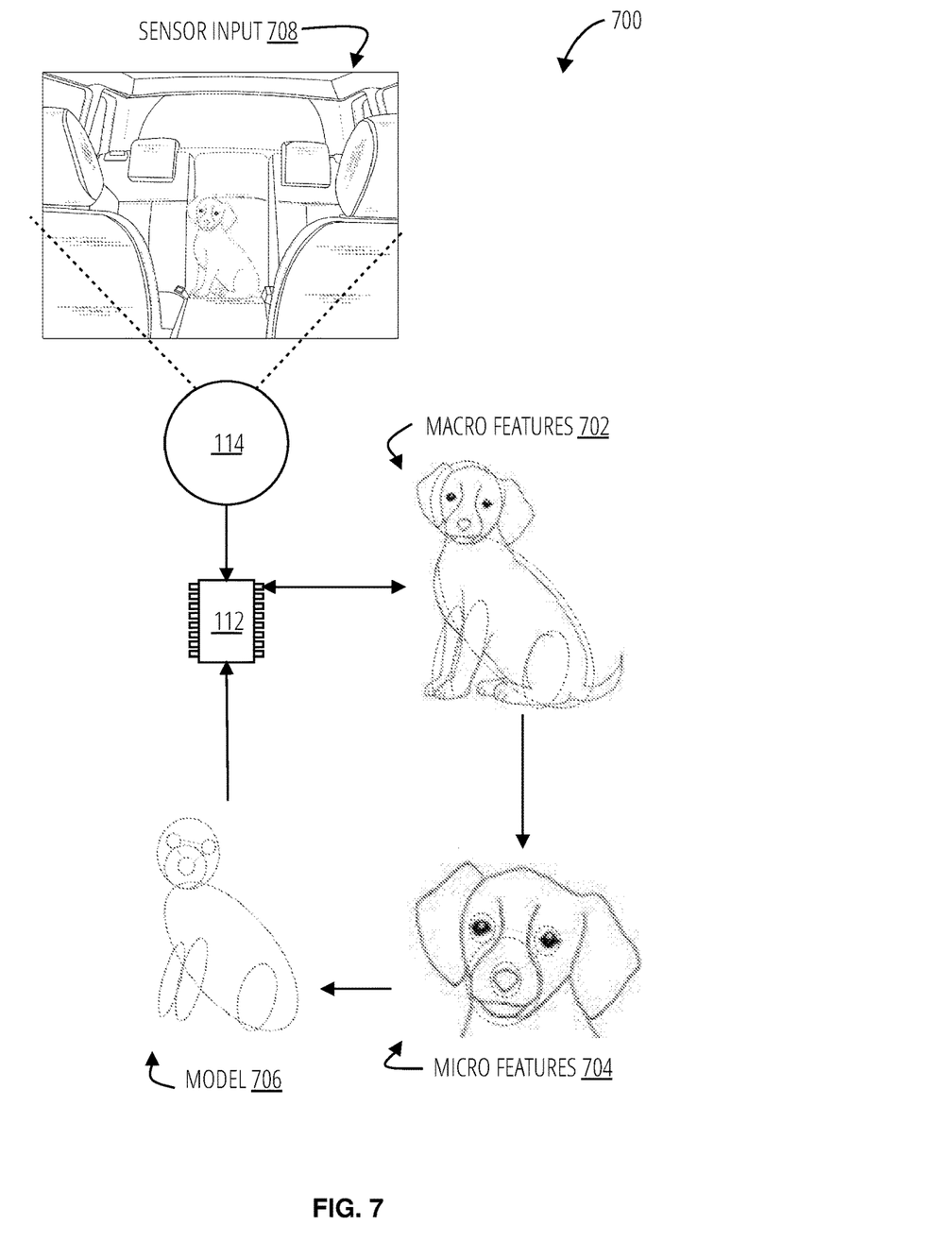
FIG. 7 illustrates an embodiment of a recognition system 700.

Referring to FIG. 7, a recognition system 700 comprises a processor 112, a plurality of sensors 114, a macro features 702, a micro features 704, a model 806, and a sensor input 708. The plurality of sensors 114 may receive the sensor input 708 and transmit it to the processor 112. In this embodiment, the processor 112 may utilize blob detection for animal occupant identification. Alternatively, a convolutional neural network may be used as well. The system may detect regions of differing properties, for example color or brightness, to identify the macro features 702 and the micro features 704, which may then be correlated with an existing model 706 of to identify the animal occupant.

Figure 8:
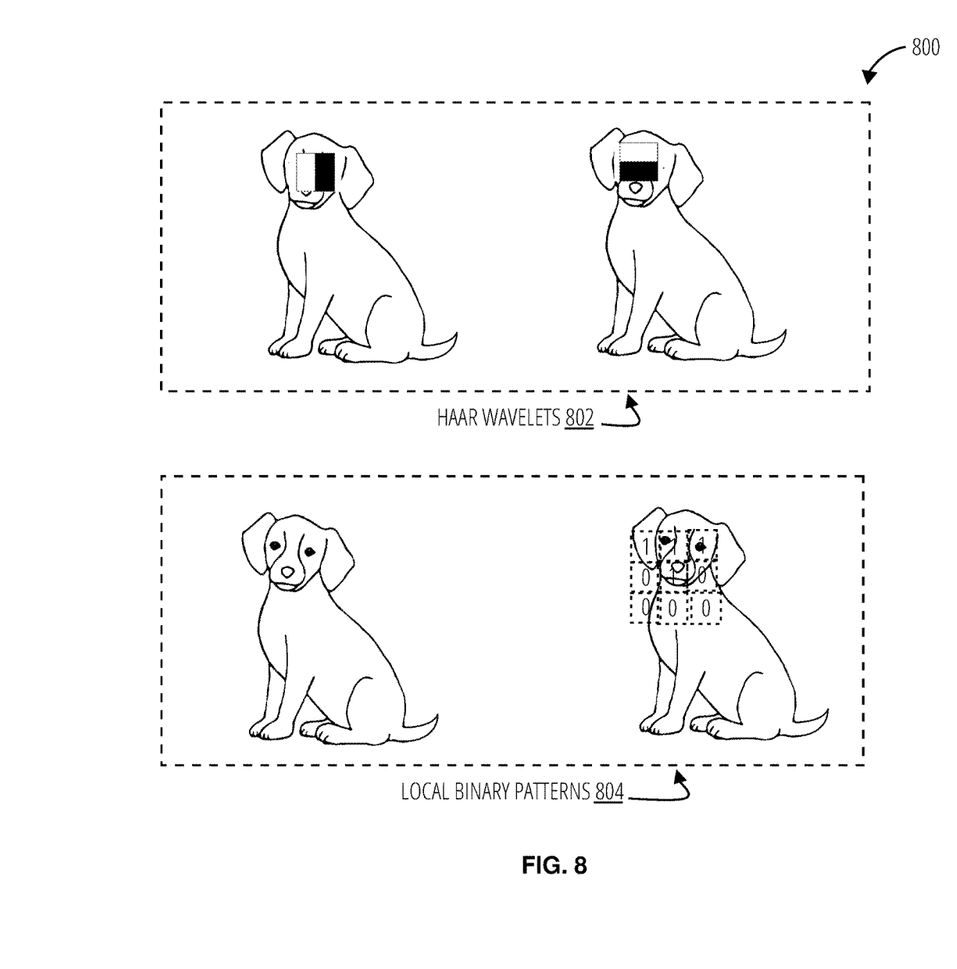
FIG. 8 illustrates embodiments of a recognition routine 800.

Referring to FIG. 8, a recognition routine 800 illustrates possible techniques for image classification comprising Haar wavelets 802 and local binary patterns 804. The system may apply classifiers utilizing these image recognition routines to detect the presence of an animal occupant and to identify the animal occupant.

Figure 9:
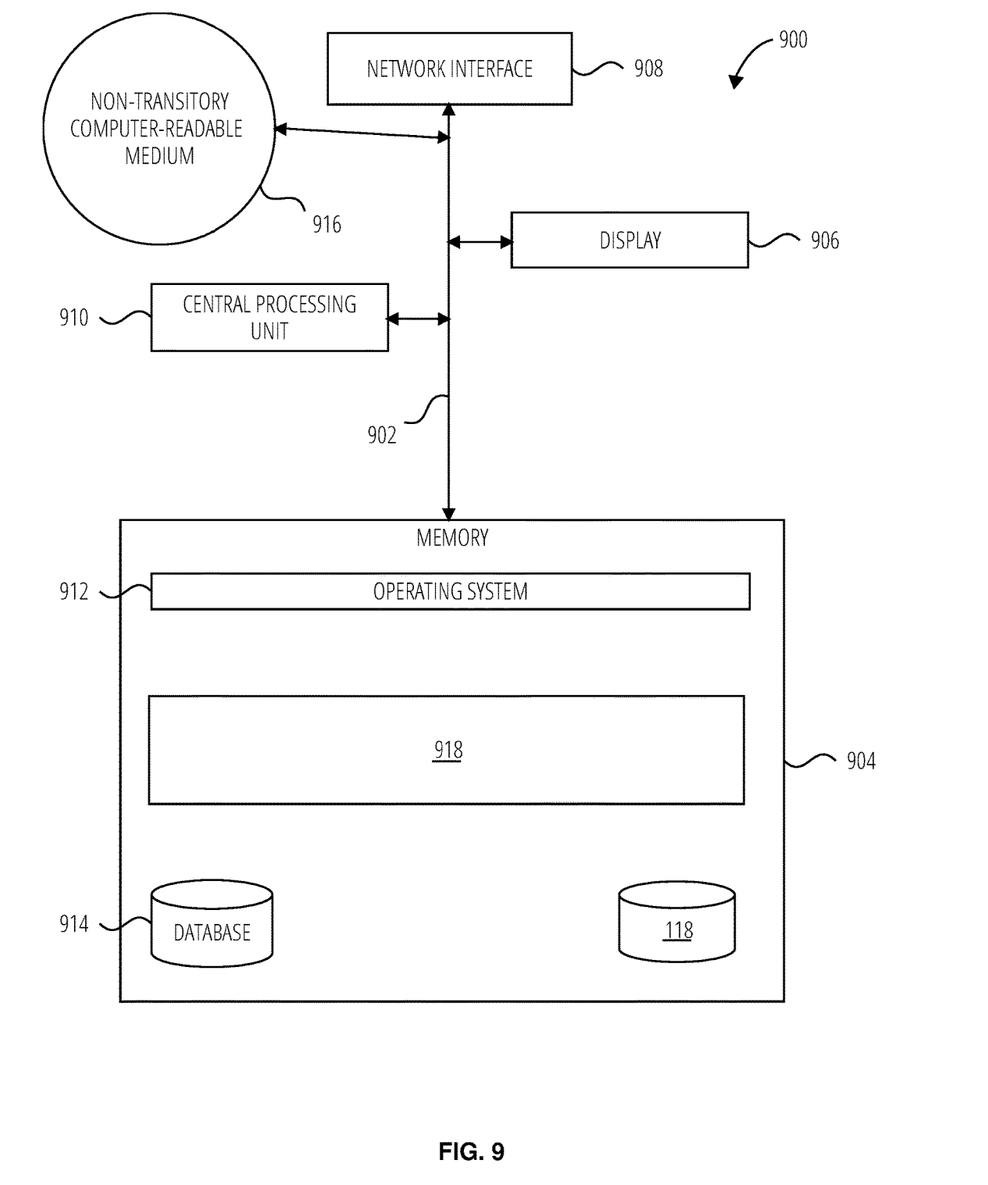
FIG. 9 illustrates a system 900 in accordance with one embodiment.

FIG. 9 illustrates several components of an exemplary system 900 in accordance with one embodiment. In various embodiments, system 900 may include a desktop PC, server, workstation, mobile phone, laptop, tablet, set-top box, appliance, or other computing device that is capable of performing operations such as those described herein. In a preferred embodiment, the system 900 is a vehicle computer system integrated with a dashboard display. In some embodiments, system 900 may include many more components than those shown in FIG. 9. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 900 may comprise one or more physical and/or logical devices that collectively provide the functionalities described herein. In some embodiments, system 900 may comprise one or more replicated and/or distributed physical or logical devices.

In some embodiments, system 900 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 900 includes a bus 902 interconnecting several components including a network interface 908, a display 906, a central processing unit 910, and a memory 904.

Memory 904 generally comprises a random access memory ("RAM") and permanent non-transitory mass storage device, such as a hard disk drive or solid-state drive. Memory 904 stores an operating system 912.

These and other software components may be loaded into memory 904 of system 900 using a drive mechanism (not shown) associated with a non-transitory computer-readable medium 916, such as a floppy disc, tape, DVD/CD-ROM drive, memory card, or the like.

Memory 904 also includes database 914. In some embodiments, system 900 may communicate with database 914 via network interface 908, a storage area network ("SAN"), a high-speed serial bus, and/or via the other suitable communication technology.

In some embodiments, database 914 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Various terminology has been utilized herein, and terms should be given their ordinary meaning, unless otherwise indicated below.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Various processors or controllers described herein may be implemented as programmable devices. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

What is claimed is:

1. A method comprising:
receiving an activation signal comprising sensor input from a plurality of sensors within a vehicle;
processing the sensor input with a recognition routine on a processor to extract at least one animal occupant identification and initiating a selector control signal;
operating a parameter selector with the selector control signal to select a set of operation parameters from a control memory structure; and
applying the operation parameters to a controller to operate an actuator to interpose a barrier between a first area and a second area in the vehicle to confine an animal occupant within the second area.

2. The method of claim 1 wherein the activation signal is initiated from the animal occupant identification.

3. The method of claim 1 wherein the activation signal is initiated by detection of a preset condition.

4. The method of claim 3 wherein the preset condition further comprises at least one of:
the vehicle's state;
an action performed via a user interface;
a location of the vehicle;
detection of human or animal occupants; and
a configuration of the human and animal occupants.

5. The method of claim 4 wherein the configuration of human and animal occupants further comprises a human in the first area and an animal in the second area.

6. The method of claim 1 wherein the recognition routine further comprises applying the sensor input to a trained neural network.

7. The method of claim 1 wherein the recognition routine further comprises one or more of (a) blob detection and (b) feature extraction and correlation.

8. The method of claim 1 wherein the barrier comprises a see-through portion further comprising at least one of:
a transparent material; and
an opaque material non-occlusively configured with at least one aperture.

9. The method of claim 1 wherein the first area and the second area comprise one of (a) different occupant areas within the vehicle, and (b) a cargo area within the vehicle.

10. A control system comprising:
a plurality of sensors including at least a camera;
at least one processor; and
at least one memory storing instructions that, when executed by the processor, cause the system to:
receive an activation signal comprising sensor input from the plurality of sensors;
process the sensor input with a recognition routine on the at least one processor to extract at least one animal occupant identification for a defined space;
initiate a selector control signal in response to the at least one animal occupant identification;
operate a parameter selector with the selector control signal to select a set of operation parameters from a control memory structure; and
apply the operation parameters to a controller to operate an actuator to interpose a barrier between a first area and a second area of the defined space to confine an animal occupant within the second area.

11. The control system of claim 10 wherein the barrier is interposed between the first area and the second area from at least one barrier storage compartment.

12. The control system of claim 10, wherein a configuration of human and animal occupants of the defined space comprises a human in the first area and an animal in the second area.

13. The control system of claim 10 wherein the recognition routine further comprises applying the sensor input to a trained neural network.

14. The control system of claim 10 wherein the recognition routine further comprises one or more of (a) blob detection, and (b) feature extraction and correlation.

15. The control system of claim 10 wherein the barrier comprises a see-through portion further comprising at least one of:
a transparent material; and
an opaque material non-occlusively configured with at least one aperture.

16. The control system of claim 10 wherein the first area and the second area comprise one of (a) different occupant areas within a vehicle, and (b) a cargo area within the vehicle.

17. A non-transitory machine-readable storage medium, the machine-readable storage medium including instructions that when executed by a machine processor, cause the machine comprising the machine processor to:
receive an activation signal comprising video from at least one camera within a vehicle;
process the video with a recognition routine on a processor to extract at least one animal occupant identification and initiating a selector control signal;
operate a parameter selector with the selector control signal to select a set of operation parameters from a control memory structure; and
apply the operation parameters to a controller to operate an actuator to interpose a barrier between a first area and a second area in the vehicle to prevent an animal occupant from passing between the first area and the second area.

18. The machine-readable storage medium of claim 17 wherein the activation signal is initiated by detection of a preset condition.

19. The machine-readable storage medium of claim 18 wherein the preset condition further comprises at least one of:
the vehicle's state;
an action performed via a user interface;

a location of the vehicle;
detection of human or animal occupants; and
a configuration of the human and animal occupants.

20. The machine-readable storage medium of claim 17 wherein the first area and the second area comprise one of (a) different occupant areas within the vehicle, and (b) a cargo area within the vehicle.

* * * * *